July 3, 1951

L. W. BUECHLER 2,558,729

FREQUENCY CONTROL SYSTEM

Filed Aug. 2, 1949

INVENTOR

Lester W. Buechler

BY

*J. H. Helvestine*

ATTORNEY

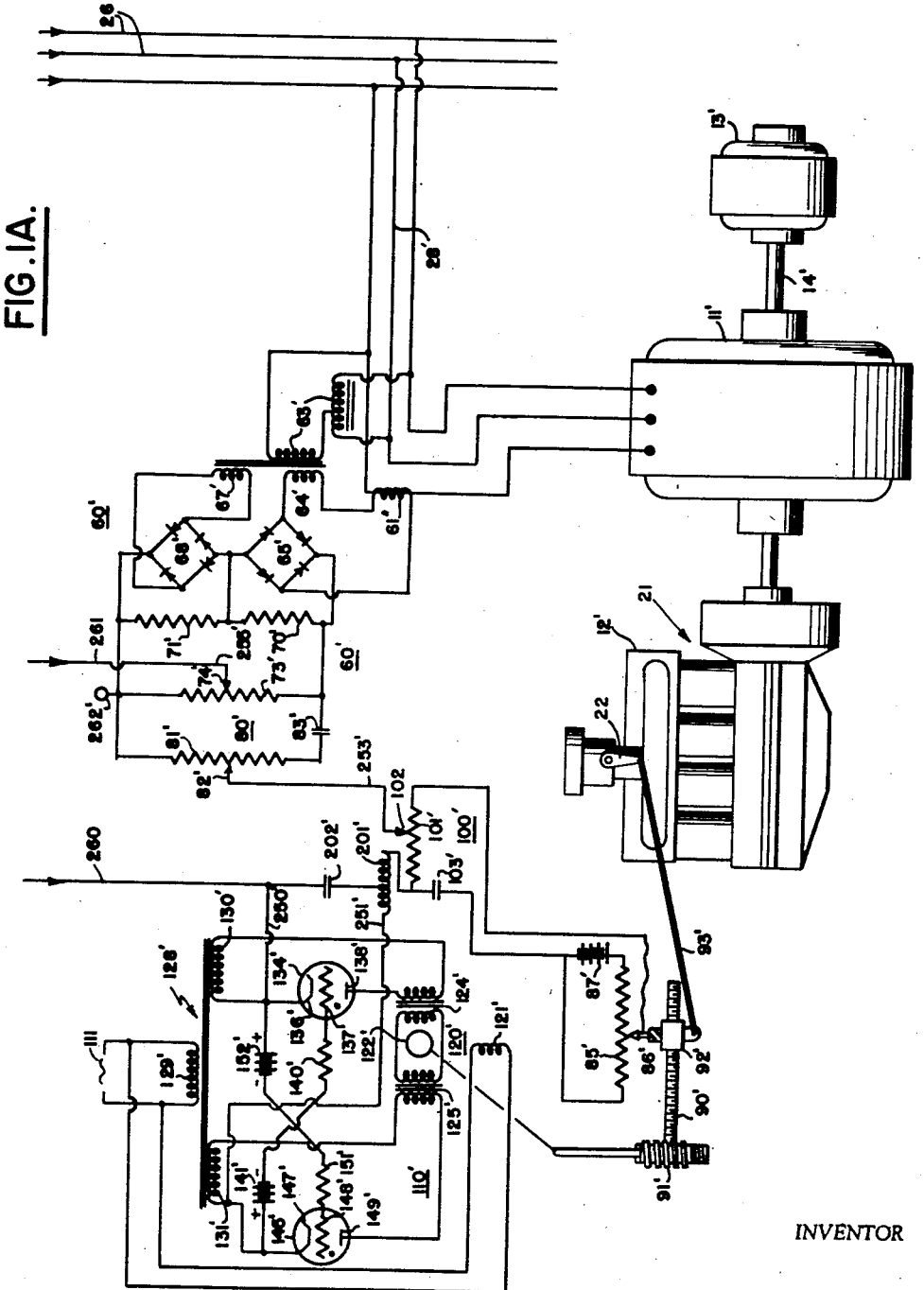

July 3, 1951
L. W. BUECHLER
2,558,729
FREQUENCY CONTROL SYSTEM
Filed Aug. 2, 1949
4 Sheets-Sheet 3
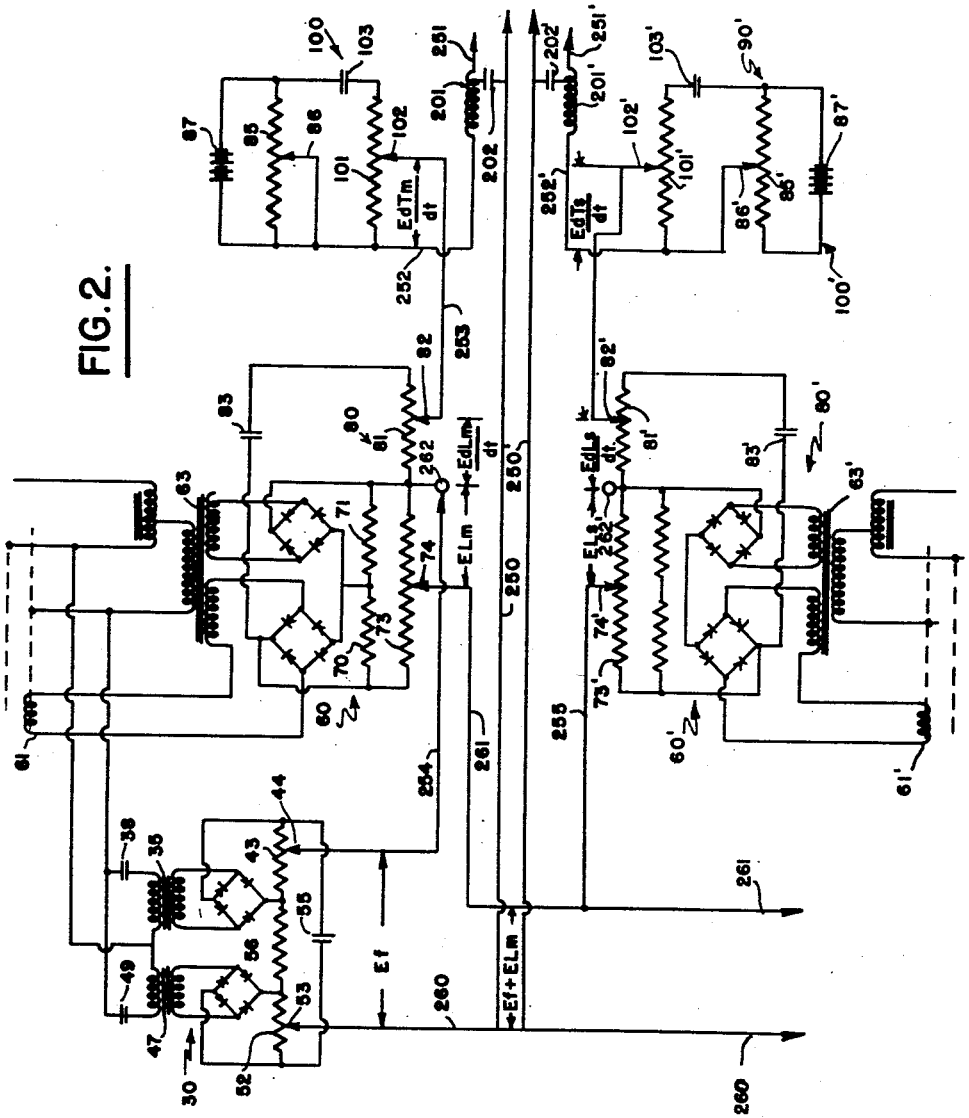
INVENTOR
Lester W. Buechler
BY
ATTORNEY July 3, 1951     L. W. BUECHLER     2,558,729
FREQUENCY CONTROL SYSTEM Filed Aug. 2, 1949     4 Sheets-Sheet 4

INVENTOR

Lester W. Buechler

BY

ATTORNEY

Patented July 3, 1951

2,558,729

UNITED STATES PATENT OFFICE 2,558,729

FREQUENCY CONTROL SYSTEM

Lester W. Buechler, Hyattsville, Md.

Application August 2, 1949, Serial No. 108,176

5 Claims. (Cl. 290—40)

(Granted under the act of March 3, 1883, as amended April 30, 1928; 370 O. G. 757)

The present invention relates to speed governors for alternating current generating units and more particularly to electrically powered throttle controls for prime movers driving alternating current generators.

Presently available speed governors for prime movers are responsive to changes in the speed of the machine, and are usually mechanical and/or hydraulic in operation. The operation of such governors is necessarily slow because the speed of the machine must actually drop before the governor becomes operative, which introduces a considerable time delay because of the inertia of the rotating mass of the unit. Even after the governor becomes operative, the machine must be accelerated to its correct operating speed, which also requires time. If the governor is made sensitive to reduce the delay in the commencement of corrective action, the unit may render the system unstable particularly where machines are connected in parallel with each other. Insensitive governors are adequate where the machines are connected to a large system, because the changes in load on the system are usually only a small fraction of the load so that certain machines can carry the fluctuation of the load and control the frequency while the remaining machines carry a substantially constant load. However, where it is necessary to employ a number of approximately equal size generating units for high reliability on a load which fluctuates over a wide range, insensitive governors produce excessive frequency changes which change the rotational speeds of motors connected to the generators. The fire control of a combatant ship is rendered inaccurate by such changes in speed, and other equipment is also adversely affected.

The present invention overcomes the above-described difficulties by employing an electrically-operated throttle operator which is responsive to the rate of change in the load on the generator, and hence operates before there is an appreciable change in the speed of the machine. The several machines automatically divide the connected load between the machines in proportion to their capacities so that the full capacity of all the machines is immediately available. Furthermore, if one machine should fail for any reason, the remaining machines will divide the load between them. Thus, a highly flexible and rapid speed governor is provided.

It is an object of the present invention to provide an electrically operated throttle operator which is responsive to the rate of change in electrical load on an alternating current generating unit.

It is a further object of the present invention to provide a frequency control system for an alternating current power system which is sensitive and stable.

It is a further object to provide a control system for an alternating current power system which will divide the electrical load among the several generators in proportion to the relative capacities of the machines.

It is a final object of the present invention to provide an inexpensive and flexible control unit which may be easily adjusted to operate on any one of a number of different units.

Further objects and advantages of the present invention will be made apparent by reference to the following description and to the annexed drawings in which:

Figs. 1 and 1A are a wiring device of the present invention.

Fig. 2 is a simplified wiring diagram of the signal-producing network of the present invention.

Figure 1:
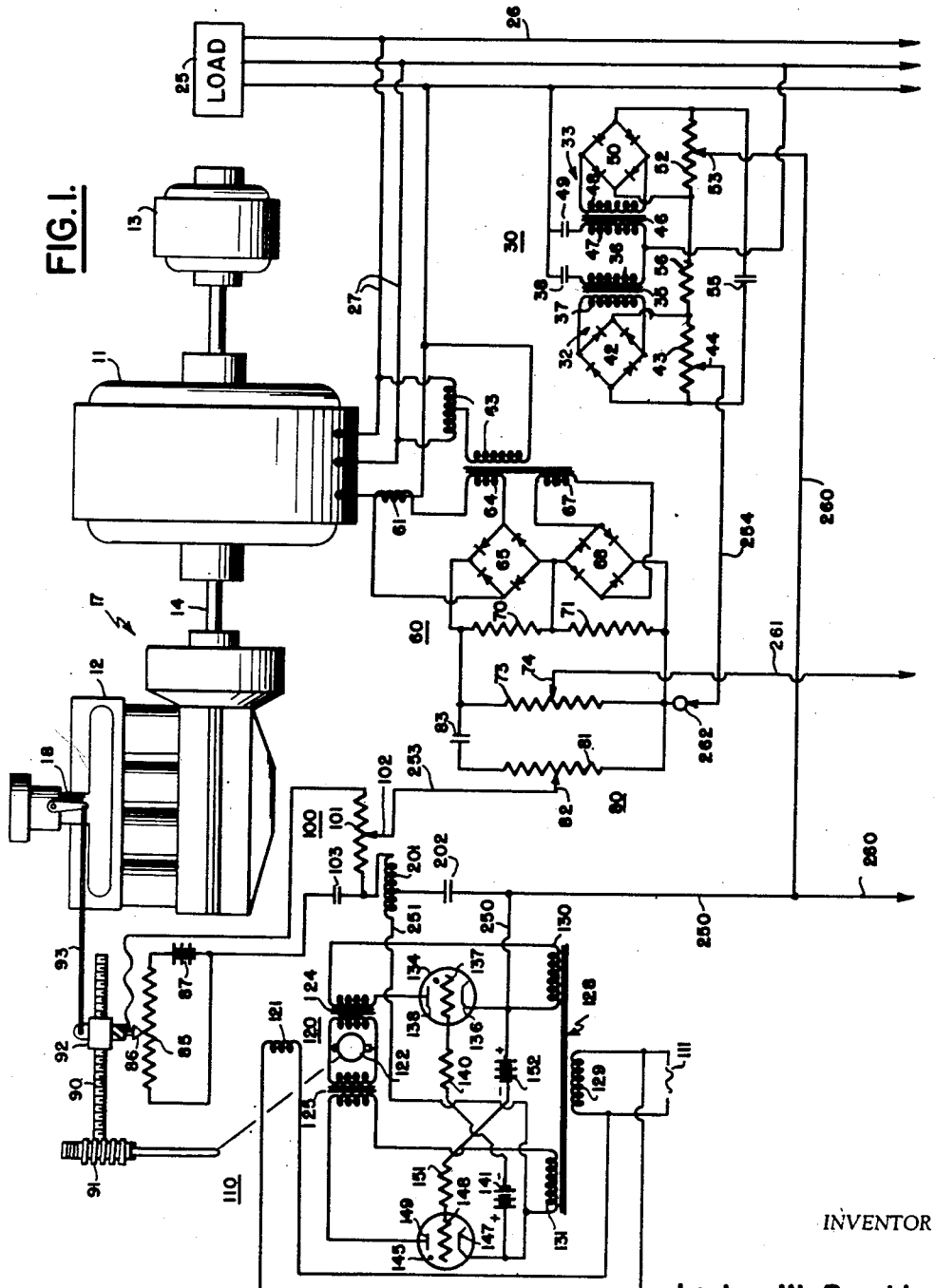

Referring now to Fig. 1, the alternating current generator 11 is driven by a prime mover 12, which may also drive the exciter 13 mounted on the shaft 14. The prime mover 12 may be of any desired type which has a throttle capable of being operated by an electric motor, and may be a steam engine, steam turbine, gas turbine, or an internal combustion engine. As shown, the prime mover is an internal combustion engine whose speed is controlled by the throttle lever 18, although the invention is not limited thereto. The design of the prime mover 12, the generator 11, and the exciter 13 are conventional and may be of any desired frequency, voltage, and capacity. The combination of the prime mover, generator, and exciter will be hereafter referred to as a generating unit. The generating unit 11 in Fig. 1 is the master unit of the illustrated system which controls the frequency and carries the throttle arm 18, while the generating unit 21 in Fig. 1A is a "slave" unit and controlled by the throttle arm 22. Several "slave" generating units may be employed on the system, if desired, and the control circuits of additional units are arranged like that illustrated in connection with generating unit 21. Similarly, the master generating unit 17 may be operated alone to carry small loads, if desired.

The units 17 and 21 may be of the same or different capacities, but must operate at the same frequency. Provision must be made to secure similar output voltages if the two are not otherwise the same. The load 25 is connected to the main bus 26 and to the generating units 17 and 21 by means of the feeders 27 and 28 respectively. These feeders would, of course, be provided with circuit breakers, instruments and relays in the usual manner, which devices are omitted for clarity. The units may be of any convenient number of phases. However, the structure illustrated represents a three-phase system operating at 60 cycles per second, although it will be obvious to those skilled in the art that modifications are readily made.

Attached to the bus 26 is a frequency-responsive circuit 30 which comprises two tuned circuits 32, 33 connected in parallel with each other, one of said circuits resonating above and the other below the desired operating frequency. The frequency responsive circuit is connected across one phase of the alternating current system, the exact point of connection to the system being relatively unimportant, since the frequency is the same everywhere on the alternating current system. For convenience, the frequency responsive circuit 30 may be connected to the main bus 26 as shown, although it may also be connected directly to a generating unit. It will also be apparent that a small alternating current tachometer having a higher frequency than the electrical system and driven at the same speed as the generating unit may also be employed instead of the system frequency as shown in Patent No. 2,161,693 to Baier, issued June 6, 1939.

Figure 3:
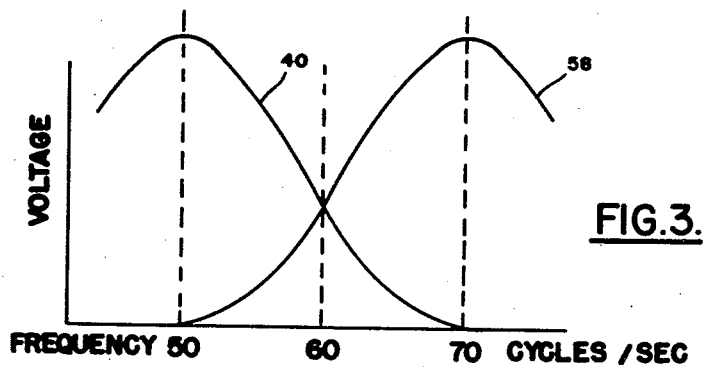
Fig. 3 is a graph illustrating the operation of the frequency responsive network of the present invention.

The tuned circuit 32 comprises a transformer 35 having a primary winding 36 and a secondary winding 37, the primary winding 36 being connected in series with a condenser 38 of such a size as to cause the series circuit to be series resonant, at a frequency below the operating frequency, such as 50 cycles, and it will be noted that the secondary voltage is maximum when the primary current in the winding 36 is also a maximum. The secondary winding 37 is connected to a rectifier 42 which rectifier may be of any desired type, such as the full-wave bridge type shown, and the output of the rectifier 42 is shunted by a variable potentiometer 43 having a movable arm 44. The voltage impressed on the potentiometer 43 is illustrated by the curve 40 in Fig. 3.

The tuned circuit 33 consists of a transformer 46 having a primary winding 47 and a secondary winding 48, the primary winding being connected in series with a condenser 49 and the series circuit connected in parallel with the transformer winding 36 and condenser 38. The winding 47 and the condenser 49 are proportioned to produce a series resonant circuit at a frequency above the desired operating frequency, such as 70 cycles in the case of a 60 cycle system. The voltage produced by the winding is rectified by a rectifier 50, which rectifier is shunted by a potentiometer 52 having a movable arm 53 so as to produce a characteristic similar to 58 in Fig. 3. The potentiometers 43 and 52 are connected so that their output voltages oppose each other and the net voltage produced is the difference between the two. The output voltage from the frequency-responsive circuit 30 is taken off from the two movable arms 44 and 53 of the potentiometers 43 and 52 respectively. A resistor 56 is connected between the potentiometers to increase the resistance of the circuit so as to limit the current passing through the secondary winding and help reduce interference with the resonant frequencies of the tuned circuits 32 and 33. While the resistance 56 may be omitted in some cases, its use is desirable and it may be made adjustable, if desired. The condenser 55 provides filtering of the output of the circuit 30.

It should be noted that the output of the frequency-responsive network 30 is zero at the desired operating frequency, which frequency may be shifted slightly by varying the relative settings of the potentiometer arms 44 and 53. The polarity of the output voltage changes as it passes through desired operating frequency, and the amplitude of the signal may also be adjusted by adjustment of the potentiometer arms 44 and 53.

The load responsive circuit 60 is connected to the feeders of the generating unit with which it is associated and produces a direct current signal which is proportional to the load on the associated machine, each machine being provided with an individual load responsive circuit. The load responsive circuit 60 comprises a current transformer 61 associated with one lead of the feeder connecting the generating unit to the main bus 26, the output of the transformer having a voltage and phase indicative of the current in one phase of the generating unit. A Scott-connected transformer 63 having two secondary windings 64 and 67 produces two individualized voltages of a phase angle which is in phase with the current produced by the current transformer 61 at unity power factor. The output of the current transformer 61 and the voltage from winding 64 are connected in series with each other and the rectifier 65 to produce a direct current voltage which is proportional to the vector sum of the phase voltage and current carried by the generating unit. The winding 67 is connected to a rectifier 68 and produces a direct current voltage proportional to the phase voltage. The direct current from rectifier 68 is subtracted from the output of rectifier 65, thus producing a direct current signal voltage which is approximately equal to $I \cos \theta$, where I is the current in the phase associated with the current transformer 61 and $\cos \theta$ is the power factor angle of the current with respect to the voltage. As is well-known to those skilled in the art, the power output of a generator supplying a balanced three-phase load is equal to $\sqrt{3} \, EI \cos \theta$, and since the voltage is maintained substantially constant, the quantity $I \cos \theta$ is an approximate measure of the power output of the generating unit.

Figure 5:
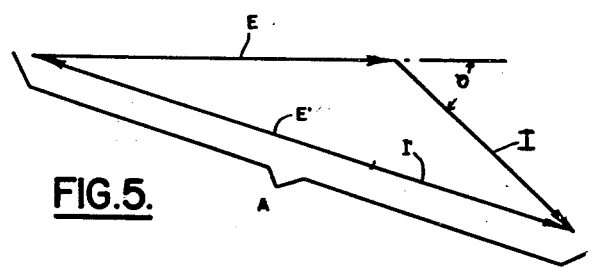
Fig. 5 is a graph illustrating the signal produced by the rate of change in the load network and the rate of change in the throttle setting.

The operation of the load responsive circuit 60 may be readily understood by reference to Fig. 5. The winding 64 produces a voltage E while the current transformer 61 produces a voltage I having a power factor angle $\theta$ with respect to the voltage E. The vector addition of these voltages produces a direct current voltage from the rectifier 65 which is proportional to the vector A, while the winding 67 and rectifier 68 produce the voltage E'. The output of the circuit 60 is the voltage I', which approximately equals $I \cos \theta$. The voltage I' is directly proportional to $I \cos \theta$ when θ equals zero, and is slightly in excess thereof for other values of θ. However, the losses in the machine also increase as θ becomes larger, so that the voltage I' is a reasonably accurate measure of the input requirements of the generating unit.

The output of rectifier 65 is shunted by the resistance 70 while the rectifier 68 is shunted by the resistance 71. The difference between the output voltages of the rectifiers 65 and 68 is impressed on a potentiometer 73 having a movable arm 74. The output is taken off between an end of the potentiometer 73 and the movable arm, so that the output voltage may be proportioned by moving the arm 74 on the potentiometer. This adjustment is proportioned to produce the same voltage output from each of the several generating units operating on the system with the same proportionate load on each one, so that the load voltages of generators of different capacities may be directly compared with each other.

A load rate circuit 80 is provided to produce a voltage proportional to the rate of change and of a polarity indicative of the direction of change in the load, which voltage is produced by a differentiating circuit connected to the ends of the potentiometer 73. The differentiating circuit consists of a potentiometer 81 and a condenser 83 connected in series, the voltage being produced across the potentiometer 81. The movable arm 82 on the potentiometer 81 provides a convenient method of adjusting the proportion of the voltage applied to the throttle operating circuit.

Each generating unit is equipped with an individual throttle operator 110 which mechanically moves the throttle lever to control the power output of the prime mover. The throttle operator 110 consists of a reversible motor 120 suitably connected to actuate the throttle lever and a motor control circuit to control the speed and direction of the motor rotation in accordance with the voltage and polarity of a voltage impressed on its input circuit. The motor 120 may be connected to the throttle lever by any suitable means. As illustrated, the motor 120 is mechanically connected to the rotating screw 90 which carries on it a non-rotating nut 92 which moves along the screw as it is revolved. The mechanical connection is shown for the purposes of illustration as a worm drive 91, although it should be understood that a large number of different arrangements may be employed. The non-rotating nut 92 is connected to the throttle lever by means of the linkage 93.

Figure 4:
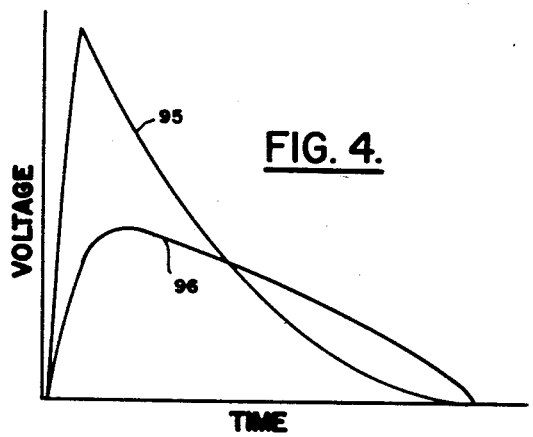
Fig. 4 is a graph illustrating the operation of the load detecting circuit of the present invention.

In order to accurately stop the throttle arm 18 in the correct position without overshooting, a voltage proportional to the speed at which the throttle is changing its setting is also impressed upon the input circuit of the throttle operator 110. A voltage proportional to the motor speed will, of course, be proportional to the throttle speed, and may be produced by a small permanent magnet direct current generator driven by the motor 120 as shown in Patent No. 2,105,598 to Hubbard issued January 18, 1938, or by other suitable means. The throttle response circuit 100 shown employs inexpensive resistors and condensers. A resistance strip 85 is arranged parallel with the screw 90 and energized from a source of direct current 87. A contact 86 carried by the non-rotating nut 92 bears on the resistance strip and provides a voltage between one end of the resistance strip 85 and the arm which is a measure of the throttle setting. A differentiating circuit is connected between the movable contact 86 and one end of the resistance strip 85 to provide a voltage proportional to the rate of change in the throttle setting, and consists of a potentiometer 101 having a movable arm 102 and a condenser 103 connected in series. The output voltage is taken off between the movable arm 102 and one end of the potentiometer 101, the movable arm allowing adjustment of the amplitude of the output voltage to adjust the degree of damping provided by the circuit. The output voltage is illustrated by curve 96 in Fig. 4.

Each generating unit must be equipped with a load-responsive circuit and a throttle response circuit 100 individually connected with the generating unit. However, only a single frequency responsive unit is required for the electrical system, since the frequency is the same at all points. Since the frequency responsive circuit, the load responsive circuit and the throttle response circuit, as well as the load rate circuit each produce a direct current signal, the signal may be readily combined in any desired manner to produce a signal which is an algebraic sum of the voltages without considering the phase relationships. The algebraic sum, or net signal, is thus a direct current voltage which changes in amplitude and polarity, and for this reason, the throttle operator must be designed to be controlled in speed and direction by changes in amplitude and polarity, respectively, of the applied signal. The design of such a motor control system is well-known, and may be controlled by saturable core reactors as shown by Patent No. 2,338,423 to Geyger issued January 4, 1944, polar relays, and/or thyratron tubes as shown in Patent No. 2,105,598 to Hubbard, issued January 18, 1938, previously referred to. It is also possible to use generator-control motor systems as shown in Patent No. 2,417,784 to Schaelchlin et al. issued March 18, 1947. The direct current signal may be converted to alternating current and used to control induction motors in a manner illustrated in Patent No. 2,423,479, issued July 8, 1947.

The motor control circuit illustrated in the present disclosure is shown for simplicity, and is fully described in Patent No. 2,020,275 issued November 11, 1935, to Beers. The motor 120 is an alternating current commutator motor, the field 121 of which is energized from a source 111 of alternating current. The armature 122 is supplied with alternating current through the transformers 124 and 125 which transformers are selectively energized by current of opposite phase to control the direction of rotation of the motor 120.

The transformers 124 and 125 are connected to supply alternating current to the armature 122, one transformer producing a voltage in phase with the field voltage, while the other produces a voltage whose phase is reversed with respect to the field voltage, whereby the direction of rotation of the motor is determined by the selective excitation of the transformers 124 and 125. The excitation of the transformers 124 and 125 is supplied through the transformer 128 which has a primary winding 129 connected to the alternating current source 111 and two individualized secondary windings 130 and 131. The secondary winding 130 is connected in series with the primary of transformer 124 and the anode-cathode circuit of the gas filled grid controlled rectifier tube 134, the rectifier tube 134 being connected to pass current in one direction when the tube 134 is conducting, while the secondary winding 131 is connected in series with the primary winding of transformer 125 and the anode-cathode circuit of the gas filled grid controlled rectifier tube 145, the rectifier being connected to pass current in a direction opposite to the current through the rectifier tube 134.

The grid 137 of gas filled grid controlled rectifier tube 134 is connected through a resistance 140 to the negative side of a battery 141, the positive side of the battery being connected to the cathode 147 of the other gas filled grid controlled rectifier tube 145. Similarly the grid 148 of the gas filled grid controlled rectifier tube 145 is connected through a resistance 151 to the negative side of a battery 152, the positive side of which is connected to the cathode 136. The batteries 141 and 152 are adjusted to provide a grid bias which will prevent conduction by the thyratron tubes 134 and 145 when the cathodes 136 and 147 thereof are maintained at the same potential, and the resistances 140 and 151 are interposed in the grid circuit to prevent appreciable grid current from flowing in either tube in the event the grid should become positively charged with respect to the cathode of the tube.

The net signals previously described are applied between the cathodes 136, 147 of the two rectifier tubes, respectively, so that one grid is made less negative with respect to its respective cathode, while the other grid is made more negative with respect to its respective cathode. Thus, one tube is rendered conducting and energizes the motor to operate in a direction and at a speed determined by the polarity and amplitude of the applied signal.

In setting up the electrical frequency control, one machine is selected as the "master" unit, and the remaining machines are used as "slave" units, which follow the speed of the "master" unit. As illustrated herein, the generating unit 17 is the "master" unit while the generator unit 21 is a "slave" unit, although it will be apparent that a number of "slave" units may be employed, the successive each being connected in the manner shown for the generator unit 21.

When the generating units are operating at the correct speed and carrying a stable load, the frequency-responsive circuit 30 produces no signal, and under stable load conditions the throttle response circuit 100 and the differentiating circuit applied to the load responsive circuit 60 produce no signal. However, each of the load responsive circuits produces an output which is proportional to the load on the associated unit. The master unit 17 is responsive to the frequency signal and to the rate of change in the load. However, this combination produces such powerful signals that the operation of the generating unit 17 becomes unstable and "hunts" constantly. To provide stability, the throttle response signal is subtracted from the sum of the frequency signal and the rate of change in the load, so that the signal applied to the throttle operator 100 is $$E_f + \frac{E_{dLm}}{dt} - \frac{E_{dTm}}{dt}$$

Where $E_f$ is the signal from the frequency responsive circuit 30

$$\frac{E_{dLm}}{dt}$$

is the rate of change produced by the differentiating circuit of the load responsive circuit of the master unit, and $$\frac{E_{dTm}}{dt}$$

is the rate of change of the throttle setting of the master unit produced by the throttle response circuit 100.

Referring to Fig. 2, the leads 250 and 251 of the throttle operator 110 are connected to a filter circuit 201, 202 which comprises inductance and capacitance in a conventional manner. As illustrated, the filter comprises a center tapped inductance 201 and a condenser 202, and reduces the alternating current component of the signal to a negligible quantity. The voltage applied to the signal may be traced as follows: From the wire 251 through the inductance 201 and by wire 252 to the resistance 101, thence from movable arm 102 on the resistance 101 to the movable arm 82 on the resistance 81 via wire 253.

The end of resistance 73 is connected by wire 254 to the movable arm of the potentiometer 43, and the movable arm on potentiometer 52 is connected to the wire 250 by lead 260.

The "slave" generating unit 21 is arranged to receive a signal which causes it to carry a proportionate part of the load, and the signal applied to its throttle operator is $$E_f + E_{Lm} - E_{Ls} + \frac{E_{dLs}}{dt} - \frac{E_{dTs}}{dt}$$

Where $E_{Lm}$ is a voltage proportionate to the load on the master unit.

$E_{Ls}$ is a voltage proportionate to the load on the slave unit.

$$\frac{E_{dLs}}{dt}$$

is a voltage proportionate to the rate of change of the load on the slave unit, and $$\frac{E_{dTs}}{dt}$$

is a voltage proportionate to the rate of change in the throttle setting of the slave unit.

Under stable conditions, all the above voltages except $E_{Lm}$ and $E_{Ls}$ are zero, so that the slave unit is controlled by its load. The voltages $E_{Lm}$ and $E_{Ls}$ are adjusted to have a ratio to each other which is the inverse of the ratio of the capacities of the master and slave units, which ratio is readily settable by means of the movable arms 74 and 74' on the load responsive circuit 60 connected with the respective generating units. When the quantity $E_{Lm} - E_{Ls}$ is numerically equal to zero, the signal applied to the slave throttle operator 110 becomes zero and it stops the throttle arm 22 in the desired position.

The operation of the master generating unit 17 is as follows: Assuming that the generating unit 17 is operating at the correct frequency with a stable load, the net signal applied to the throttle operator 110 is zero and the throttle operator is at rest. Upon the application of a load increase, the load-responsive circuit 60 produces an immediate signal on its differentiating circuit which initiates operation of the throttle operator to move the throttle arm 18 in the direction necessary to increase the speed of the generating unit. The signal from the load responsive element 60 will precede any actual change in frequency on the system, and so anticipates a signal from the frequency-responsive circuit 30. As the throttle operator begins operating, the throttle response circuit 100 produces a signal which opposes and reduces the effect of the signal from the load responsive circuit 60, and since the voltage from the load rate circuit diminishes exponentially from its initially high value while the throttle response voltage is dependent upon the speed of operation of the throttle operator 110, the latter voltage persists longer than the load rate voltage. Since the throttle responsive voltage is of opposite polarity to the load signal, the throttle operator is dynamically stopped. If the resulting throttle movement has not increased the power output of the prime mover sufficiently to prevent a speed change during the persistence of the load rate voltage, the frequency-responsive circuit 30 produces a signal which continues the corrective movement of the throttle arm 15 until the frequency is restored to the desired value. In either case, the throttle response circuit voltage prevents "overshooting" and the resulting "hunting."

The voltage produced by the load responsive circuit 60 and the voltage from the frequency responsive circuit 30 are differentially combined and are used to control the slave unit or units. The combined frequency responsive voltage and load voltage is taken from the master generating unit by a circuit extending from lead 260, the potentiometer arm 53 on potentiometer 52, through potentiometer 52, resistance 56, potentiometer 43, wire 254, potentiometer 73, potentiometer arm 74, to lead 261.

The signal applied to the throttle operator 110' on the "slave" generating unit 22 is composed of the combined frequency voltage and master unit load voltage from leads 260 and 261 from which is subtracted the slave load voltage from the load responsive circuit 60' and the slave load rate voltage from the load rate circuit 80' and the slave throttle response voltage is subtracted from the resultant. The circuit for the "slave" control signal extends from lead 250' to lead 260 and from lead 251' through the filter inductance 201' to the resistance strip 84' by the lead 252' and through the resistance 101' to the movable contact 102'. The movable contact 102' is connected to the potentiometer arm 81' of the load rate circuit 80' and through the potentiometer 81' to the potentiometer 73' and the arm 74' which is connected to the lead 261 by the wire 255.

Upon an increase in the load 25, the load on both the "master" unit and "slave" unit 22 increases and produces voltages on the load rate circuits 80 and 80' to energize the throttle operators 110 and 110' in a direction to increase their speed, and the operation of the throttle operators 110 and 110' produce voltages across resistances 101 and 101' which oppose the load rate voltages to prevent "overshooting." If the load is correctly distributed between the generating units, the load responsive circuit elements 73 and 73' produce no net signal, but if the distribution of the load is not correctly proportioned between the several units, a voltage is applied to the slave machine of a polarity and amplitude to correct the distribution. If the frequency of the system should be reduced a frequency signal will also be applied to both throttle operators 110 and 110' to correct the frequency.

It should be observed that the master generating unit 17 and the slave generating unit 21 are the same with the exception of the connection of wire 254 to the terminal 262 on the load responsive circuit 60. If the connection of the wire 254 is changed from the terminal 262 to the terminal 262' on the load responsive unit 60', the generating unit 21 becomes the master generating unit instead of the unit 20. It is thus a very simple matter to change the system around to suit changing operating conditions, and to remove damaged units from the circuit if necessary. Since the several load responsive circuits have been proportioned in accordance with the capacities of the machines, no readjustment of the control units is necessary.

It will be apparent to those skilled in the art that a number of modifications of the present invention may be made without departing from the spirit of the invention. The anti-hunt circuit illustrated employs the first derivative of the throttle displacement, but it will be realized that the second derivative of the throttle displacement may also be used singly or in combination with the first derivative to provide a desired damping for the throttle operator by means of a filter such as that shown in Patent No. 2,439,198 to Bedford issued April 6, 1948.

It will also be apparent to those skilled in the art that the master unit may be operated alone to carry loads if such operation should be desired. If manual control of the throttle lever should be desired, it will be realized that a control handle may be added to the rotating screw 90 as shown by Patent No. 2,485,374 to Farnham et al. issued October 18, 1949, or a separate signal may be applied from a battery or other direct current source to the motor 120 through a manually operated switch as shown by Patent No. 2,292,844 to Perry et al. issued August 11, 1942.

The device herein described may be manufactured and used by and for the Government of the United States of America for governmental purposes without the payment of any royalty therefor or thereon.

What is claimed is:

1. In a frequency control system for an alternating current generator driven by a prime mover having a power-controlling throttle, a frequency-responsive network connected to said alternating current generator for producing a voltage of opposite polarity in response to deviation of the frequency of said alternating current generator above or below the desired frequency, a load responsive network connected to said alternating current generator for producing a voltage proportional to the rate and direction of change of the load on said alternating current machine, a reversible electric motor mechanically connected to the throttle of said prime mover, a throttle response circuit operatively connected to said throttle to produce a voltage proportional to the rate and direction of movement of said throttle, and an electrical circuit connected with said electric motor for controlling the speed and direction of said electric motor in accordance with the sum of the voltages from said frequency responsive circuit and said load responsive circuit opposed by the voltage from said throttle response circuit, whereby operation of said electric motor is initiated by the rate of change of the load on the alternating current generator and terminated by the throttle response circuit without excessive operation.

2. In a frequency control system for an alternating current generator driven at a desired frequency by a prime mover having a power-controlling throttle, a frequency responsive circuit energized by said alternating current generator and comprising a first tuned circuit resonating at a frequency below the desired frequency for producing a first voltage varying with the frequency deviation from the resonant frequency of said first tuned circuit, a second tuned circuit resonating at a frequency above the desired frequency for producing a second voltage varying with the frequency deviation from the resonant frequency of said second tuned circuit, and circuit means for producing a third voltage proportional to the algebraic difference between said first and second voltages, a load responsive circuit connected with said generator and comprising a first circuit for producing a fourth voltage proportional to the vector sum of the phase current and phase voltage of one phase of said generator, a second circuit for producing a fifth voltage proportional to said phase voltage, and circuit means for producing a sixth voltage proportional to the rate of change of the difference between said fourth and fifth voltages, an electric motor mechanically connected to said throttle, a throttle response circuit operated by said electric motor for producing a seventh voltage proportional to a function of the operating speed of said electric motor, and a motor control circuit connected with said electric motor to control its speed and direction of rotation in accordance with the algebraic sum of the algebraic difference between said sixth and seventh voltages and said third voltage.

3. In a frequency and load distribution control circuit for a plurality of alternating current generating units operating in parallel at a desired frequency each comprising an alternating current generator driven by a prime mover having a power-controlling throttle, a throttle operator for each prime mover mechanically connected to said throttle and comprising a reversible electric motor and a motor control circuit for controlling the direction and speed of rotation of the motor in accordance with the polarity and magnitude of a signal voltage impressed on the input terminals of said throttle operator, a throttle response circuit operated by each of said electric motors for producing a first voltage proportional to a function of the rate and direction of operation of said electric motor, a load responsive circuit connected with each of said generators to produce a second voltage proportional to the electric power produced by the generator, a derivation-taking circuit connected with said second voltage to produce a third voltage whose polarity and magnitude varies with the direction and rate of change of the load respectively, a frequency responsive circuit connected to said electrical system to produce a fourth voltage whose polarity and magnitude vary with the direction of deviation and the deviation from the desired frequency respectively, first circuit means for impressing on the throttle operator associated with a first generating unit a signal voltage proportional to the algebraic sum of the algebraic difference between said first and said third voltages from said first machine and said fourth voltage, and second circuit means associated with each remaining prime mover to impress on the throttle operator thereof a signal voltage composed of the algebraic sum of the algebraic difference between said fourth voltage and said second voltage from said first generating unit, the algebraic difference between said first and third voltages from the associated generating unit, and the second voltage from the associated unit, whereby said first generating unit controls the system frequency and each generating unit carries a proportionate part of the system load.

4. In a frequency and load division control system for an alternating current power system supplied by a plurality of alternating current generating units each comprising a prime mover having a power-controlling throttle and an alternating current generator driven by said prime mover at a desired frequency, said generators being connected in parallel with each other, a throttle operator for each generating unit comprising an electric motor mechanically connected to the throttle of the prime mover of said generator unit and a motor control circuit for said motor so constructed as to control the motor speed and direction in accordance with the magnitude and polarity of a signal voltage impressed on the input of said throttle operator, a load responsive circuit for each generating unit connected with the electrical output circuit of the generator thereof and comprising a current transformer for producing a first voltage whose magnitude is indicative of the load on said machine, a differentiating circuit connected to be energized by said first voltage to produce a second voltage whose magnitude and polarity are indicative of the rate of change and direction of change of the load on said generator, a frequency-responsive circuit connected to said alternating current system to produce a third voltage whose magnitude and polarity is indicative of the deviation and the direction of deviation of the frequency from the desired frequency, a throttle response circuit operated by each throttle operator to produce a fourth voltage indicative of the response of said throttle operator, first circuit means for impressing on the input of the throttle operator associated with a first generating unit a signal voltage proportional to the sum of the difference between said second voltage and said fourth voltage and said third voltage, second circuit means for impressing on the remaining ones of said input circuits of said throttle operator a signal voltage comprising the sum of the differences between said first voltage from said first generating unit and said first voltage from the generating unit associated with said throttle operator and between said second voltage and said fourth voltage from the generating unit associated with said throttle operator.

5. In a frequency and load distribution control system for a master generating unit and a slave generating unit operating in parallel each comprising a prime mover having a throttle and an alternating current generator driven by said prime mover at a predetermined speed, a throttle operator connected with each of said throttles, a frequency responsive circuit connected to said generators producing a first voltage varying with deviations from said predetermined speed, a load responsive circuit connected to each of said generators producing a second voltage proportional to the load on the generator connected thereto, a throttle response circuit connected to each throttle operator producing a fourth voltage proportional to a function of the speed of said throttle operator connected thereto, and means for controlling the throttle operator connected with said master generating unit in accordance with the difference between said first voltage and said fourth voltage from said master generating unit and the throttle operator connected with said slave generating unit in accordance with the difference between the sum of said first voltage and said second voltage from said master generating unit and the sum of said second voltage from said master generating unit and said fourth voltage from said slave generating unit.

LESTER W. BUECHLER.

REFERENCES CITED

The following references are of record in the file of this patent:

UNITED STATES PATENTS

| Number | Name | Date |
|---|---|---|
| 1,505,853 | Brainard | Aug. 19, 1924 |
| 1,612,351 | Boddie | Dec. 28, 1926 |
| 1,959,163 | Hamilton, Jr. et al. | May 15, 1934 |
| 2,020,275 | Beers | Nov. 5, 1935 |
| 2,105,598 | Hubbard | Jan. 18, 1938 |
| 2,161,693 | Baier | June 6, 1939 |
| 2,292,844 | Perry et al. | Aug. 11, 1942 |
| 2,298,977 | Silber et al. | Oct. 13, 1942 |
| 2,338,423 | Geyger | Jan. 4, 1944 |
| 2,417,784 | Schaelchlin et al. | Mar. 18, 1947 |
| 2,423,479 | Caldwell | July 8, 1947 |
| 2,439,198 | Bedford | Apr. 6, 1948 |
| 2,485,374 | Farnham et al. | Oct. 18, 1949 |

FOREIGN PATENTS

| Number | Country | Date |
|---|---|---|
| 134,191 | Austria | July 10, 1933 |